2,921,906
HYDRAULIC BRAKE FLUID

George L. Doelling and Chester B. Swander, St. Louis, Mo., assignors to Wagner Electric Corporation, St. Louis County, Mo., a corporation of Delaware No Drawing. Continuation of abandoned application Serial No. 303,617, August 9, 1952. This application April 25, 1956, Serial No. 580,455

14 Claims. (Cl. 252—79)

This invention relates to fluids for use in pressure systems. More particularly it relates to hydraulic brake fluids, especially to brake fluids usable at extremely low temperatures as well as at temperatures usually encountered in the operation of automobiles, buses, trucks or military vehicles.

This application is a continuation of our copending application Serial No. 303,617, filed August 9, 1952, entitled "Brake Fluid," now abandoned.

The principal object of the present invention is to provide suitable fluids for actuating hydraulic brakes and other pressure systems on automobiles, trucks, buses, military vehicles and wherever hydraulic brakes are used, including so-called industrial brakes such as crane brakes, etc.

Another object of this invention is to provide hydraulic brake fluids which will operate satisfactorily even under severe conditions of operation. Many of the brake fluids used in passenger cars in the past are not suitable or safe for heavy-duty use in trucks, buses and military vehicles or under severe conditions of temperature or climate.

The new brake fluids of this invention are characterized by the property of being operative at extremely low winter temperatures, such as is required in military vehicles in nothern climates, as well as in summer weather in milder climates, and under heavy-duty conditions.

This invention comprises hydraulic brake fluids having ingredients and combinations of ingredients, the proportions thereof, and features of composition and synthesis, which will be hereinafter described and claimed.

The generally accepted requirements of a satisfactory hydraulic brake fluid are as follows:

It must be sufficiently high in boiling point so that it does not vaporize while in use in the system. It must not freeze or solidify even at extremely low winter temperatures. Its viscosity at low temperatures must not be over about 2200 centistokes at the lowest temperature encountered in use. It must not corrode metals or have a swelling or deleterious effect on rubber sealing elements. Also, good lubricating value, water-tolerance, stability under heat, and miscibility with other brake fluids, are required.

One difficulty with brake fluids to date has been that if a sufficient amount of lubricant, such as castor oil or ricinoleate ester, was used to give good lubricating value, then the fluid would have inferior low-temperature properties, a high viscosity or actually would freeze up at low winter temperatures. Since certain specifications for brake fluids now require at least 20% by weight of nonvolatile lubricant element, such as castor oil, it is difficult to meet this requirement and also meet the ever-increasing requirement for low freezing point and low viscosity at low temperatures.

To meet these requirements, and also the requirement that the lubricant element of the brake fluid should not be soluble in water, we have found that if as the lubricant element of a brake fluid, part of the lubricant is a glycol ricinoleate and part of it is an insoluble polypropylene glycol, then all of these requirements are met.

The brake fluid of this invention contains as the water-insoluble lubricant element a mixture of a ricinoleate of an aliphatic glycol and a water-insoluble polypropylene glycol, having an average molecular weight of 1,000 to 3,000. As the diluent element this fluid contains a diluent selected from the group consisting of methoxy-butanol and the lower ($C_1$–$C_4$) mono-alkyl ethers of diethylene glycol. In addition, a relatively smaller amount of one or more glycols such as propylene, butylene or hexylene glycol, and a corrosion inhibitor and an antioxidant may be used.

Our preferred composition comprises from 5 to 20% by volume of a ricinoleate of a glycol, said glycol being an aliphatic glycol having not over five carbon atoms per molecule, from 5% to 20% by volume of a water-insoluble polypropylene glycol having an average molecular weight from 1,000 to 3,000, from 50% to 75% by volume of at least one diluent chosen from the group consisting of methoxy-butanol and the lower ($C_1$–$C_4$) mono-alkyl ethers of diethylene glycol, from 5% to 25% by volume of at least one glycol chosen from the group consisting of propylene glycol, butylene glycol, and hexylene glycol, together with a corrosion inhibitor and an antioxidant if so desired.

This composition makes it possible to meet the stringent requirements of a so-called heavy duty brake fluid and still have in it a considerable amount of the castor-base type of lubricant which gives good lubricating and corrosion-resisting properties to the fluid. This has not been previously accomplished because the castor-base lubricants, where used alone, do not give a fluid which will meet the rigid freezing point and low-temperature water-tolerance tests specified for such heavy duty brake fluids. This novel composition also makes it possible to produce brake fluids in quantity even when the supply of castor oil is limited, as is often the case, especially in time of war. In the lubricant element of the fluid, the ricinoleates of the lower aliphatic glycols and di-glycols are preferred since they are stable, give good lubricating qualities to the fluid, and do not cause the fluid to congeal or freeze up at low temperatures as readily as does castor oil for example. Propylene glycol mono-ricinoleate is the preferred ricinoleate ester in this composition. Di-ethylene glycol ricinoleate and butylene glycol ricinoleate can also be used. A substantially water-insoluble polypropylene glycol having an average molecular weight of from 1,000 to 3,000 is also used in the lubricant element of the fluid. The preferred polypropylene glycol is of an average molecular weight of about 2,000. This product has a viscosity somewhat lower than castor oil, about 700 seconds Saybolt at 100° F., against about 1,390 for castor oil. Like castor oil its swelling action on rubber is very slight. Polypropylene glycol with an average molecular weight of less than 1,000, is not so desirable for this purpose, since in general, it is soluble in water, swells rubber to some extent, and has less lubricating value than the 1000 to 3000 molecular weight product.

The diluent or viscosity-reducing agent in our preferred fluid may be a glycol-ether such as 3-methoxybutanol or diethylene glycol mono-ethyl ether or other lower mono-alkyl ether of diethylene glycol. When the diluent is diethylene glycol mono-ethyl ether, the pure, so-called low-gravity grade should be used. The diethylene glycol mono-ethyl ether of the pure so-called low gravity grade has an ethylene glycol content of not more than approximately 3 percent ethylene glycol by volume. Since the commercial product may contain as much as 20% or more of ethylene glycol, it is not suitable for use in this composition. The regular commercial or high-gravity grade of diethylene glycol mono-ethyl ether is not suitable for this use because it is more corrosive, but chiefly because the viscosity of the brake fluid made with it becomes so high at −40° F. and −60° F., that it is either marginal or outside of the usual specification limits. Fluids made with the same ratio of ingredients, but using the pure low-gravity grade, have viscosities that are easily within specification limits, as is shown by the examples.

To prevent attack on the metal parts of the brake system a corrosion inhibitor may be used. Potassium ricinoleate, borax, sodium nitrite or diamylamine phosphate may be used, as well as an antioxidant such as diphenylol propane or hydroquinone or 2,6-di-tertiary-butyl 4-methyl phenol. Usually about 0.2 to 3.0% of the corrosion inhibitor and from 0.1 to 0.5% of the antioxidant, on the weight of the fluid is sufficient for the purpose.

The heavy-duty brake fluid of this invention is surprisingly low in its effect on rubber, especially when considering the very long temperature range this fluid has (from −60° F. to over 300° F.). Very high boiling-point fluids are usually rather severe in their effect on rubber. In the stroking-tests and rubber-swelling tests described in the examples, the effect on rubber was unusually mild.

The proportions of the ingredients used in applicants' composition are critical, and the proportions claimed are chosen because all of the numerous requirements of a commercially practicable brake fluid will not be satisfactorily met unless these proportions are used.

More specifically, the following examples will serve to illustrate the invention. These examples, which are illustrative of the various ratios or proportions, produce approximately 100 cc. of fluid.

Example No. 1

| | |
|---|---|
| Diethylene glycol mono-ethyl ether (pure grade) cc__ | 6.5 |
| Polypropylene glycol (mol. wt. 2,000)_____cc__ | 11.5 |
| 2-methyl-2,4-pentaneidiol _____cc__ | 5.0 |
| Propylene glycol _____cc__ | 5.0 |
| Propylene glycol mono-ricinoleate _____cc__ | 12.5 |
| Diphenylol propane _____grams__ | 0.3 |
| Potassium ricinoleate _____do____ | 0.7 |

The 2 - methyl-2,4-pentanediol is sometimes called hexylene glycol.

The brake fluid made up of the above ingredients had the following properties:

| | |
|---|---|
| Specific gravity at 20° C. _____ | .9905 |
| Color, Parlin scale_____ | 3 |
| pH, electrometric _____ | 8.82 |
| Acid number _____ | .14 |
| Viscosity at 100° F. _____centistokes__ | 8.2 |
| Viscosity at −40° F. _____do__ | 810 |
| Flash point _____° F__ | 215 |
| Boiling point _____° F__ | 385 |
| Rubber-swelling at 70° C., gain in weight after 16 hours _____percent__ | 4.23 |
| Freezing point (6 hours at −60° F.)_____ | Fluid |

The corrosion test specified in the SAE hydraulic brake fluid specification was run on this fluid (5 days at 210° F.). The aluminum strip showed no loss in weight, the tinned iron, steel, cast iron and copper each lost about .02 milligram per square centimeter, and the brass strip lost .06 milligram per square centimeter. All of these results are far below the allowable loss given in the specification, which is 0.5 each for brass and copper, 0.7 for tin, steel and cast-iron and 0.2 for aluminum. The pH after the corrosion test was 7.6.

A stroking test according to the SAE specification was run on this fluid, and the results were satisfactory, indicating adequate lubricating properties in the fluid. Results after use of this brake fluid in test-cars also were satisfactory, showing that it is an operable hydraulic brake fluid.

Example No. 2

| | |
|---|---|
| Diethylene glycol mono-ethyl ether (pure grade) cc__ | 70.0 |
| Polypropylene glycol (mol. wt. 2,000) _____cc__ | 11.5 |
| Propylene glycol _____cc__ | 5.0 |
| Propylene glycol mono-ricinoleate _____cc__ | 12.5 |
| Diphenylol propane _____grams__ | 0.3 |
| Potassium ricinoleate _____do____ | 0.7 |

The brake fluid made by mixing these ingredients had the following properties:

| | |
|---|---|
| Specific gravity at 20° C. _____ | .993 |
| Acid number _____ | 0.17 |
| Viscosity at −40° F. _____centistokes__ | 680 |
| Viscosity at 68° F. _____do____ | 13 |
| Boiling point, SAE _____° F__ | 381 |
| Cold test, 6 hours at −60° F. _____ | Fluid |

The SAE corrosion test, 5 days at 210° F., on this fluid gave very satisfactory results. In every case, on tin, steel, aluminum, cast-iron, brass and copper, the loss in weight was less than 0.1 milligram per square centimeter, or far lower than the specification limit.

The rubber-swelling after 5 days at 70° C. on a 1¼ inch Manhattan cup was 4.95% by volume.

Example No. 3

| | |
|---|---|
| Diethylene glycol mono-ethyl ether (pure grade) cc__ | 60.0 |
| Polypropylene glycol (mol. wt. 2,000) _____cc__ | 7.5 |
| Propylene glycol _____cc__ | 4.2 |
| 2-methyl-2,4-pentanediol _____cc__ | 10.0 |
| Propylene glycol mono-ricinoleate _____cc__ | 17.0 |
| Diphenylol propane _____grams__ | 0.3 |
| Potassium ricinoleate _____do____ | 1.0 |

The brake fluid made by mixing these ingredients had the following properties:

| | |
|---|---|
| Specific gravity at 20° C. _____ | .984 |
| Acid number _____ | 0.16 |
| Viscosity at 68° F. _____centistokes__ | 14.8 |
| Rubber-swelling, 5 days at 70° C., gain in percent by volume _____ | 4.7 |
| Boiling point _____° F__ | 379 |
| Cold test, 6 hours at −60° F. _____ | Fluid |

The regular SAE corrosion test, 5 days at 210° F., on this fluid gave losses in milligrams per square centimeter as follows:

| | |
|---|---|
| Tinned iron _____ | .04 |
| Steel _____ | .17 |
| Aluminum _____ | .02 |
| Cast-iron _____ | .13 |
| Brass _____ | .12 |
| Copper _____ | .02 |

All of these are far below the specification limits.

Example No. 4

| | |
|---|---|
| 3-methoxybutanol-1 _____cc__ | 55.0 |
| Polypropylene glycol (mol. wt. 2,000)_____cc__ | 10.0 |
| Propylene glycol _____cc__ | 6.7 |
| 2-methyl-2, 4-pentanediol _____cc__ | 10.0 |
| Propylene glycol mono-ricinoleate _____cc__ | 17.0 |
| Diphenylol propane _____grams__ | 0.3 |
| Potassium ricinoleate _____do____ | 1.0 |

The brake fluid made by mixing these ingredients had the following properties:

| | |
|---|---|
| Specific gravity at 20° C_____ | .951 |
| Boiling point_____° F__ | 320 |
| Viscosity at 68° F_____centistokes__ | 19 |
| Cold test, 6 hours at −60° F_____ | Fluid |
| Rubber swelling, 5 days at 70° C., gain in percent by volume_____ | 4.5% |

What we claim is:

1. A heavy-duty hydraulic brake fluid consisting essentially of, per 100 parts by volume, 50 to 75 parts by volume of at least one diluent chosen from the group consisting of methoxy-butanol and the lower mono-alkyl ethers of diethylene glycol, said ethers being of a pure low gravity grade having an ethylene glycol content of not more than approximately 3 percent ethylene glycol by volume, from 5 to 20 parts by volume of a ricinoleate of a glycol, said glycol being an aliphatic glycol having not over five carbon atoms per molecule, from 5 to 20 parts by volume of a substantially water-insoluble polypropylene glycol having an average molecular weight between 1,000 and 3,000, from 5 to 25 parts by volume of at least one glycol chosen from the group consisting of propylene glycol, butylene glycol and hexylene glycol, said polypropylene glycol plus said ricinoleate of a gycol forming a total of at least approximately 20 percent by weight of the brake fluid.

2. The fluid set forth in claim 1, wherein said fluid is provided with small but effective amounts of anti-oxidant and corrosion inhibitor.

3. A heavy-duty hydraulic brake fluid consisting essentially of, per 100 parts by volume, 50 to 75 parts by volume of a diluent chosen from the group consisting of methoxy-butanol and the lower monoalkyl ethers of diethylene glycol, said ethers being of a pure low gravity grade having an ethylene glycol content of not more than approximately 3 percent ethylene glycol by volume, from 5 to 20 parts by volume of propylene glycol mono-ricinoleate, from 5 to 20 parts by volume of a substantially water-insoluble polypropylene glycol having an average molecular weight between 1,000 and 3,000, from 5 to 25 parts by volume of at least one glycol chosen from the group consisting of propylene glycol, butylene glycol and hexylene glycol, together with small but effective amounts of anti-oxidant and corrosion inhibitor, said polypropylene glycol plus said propylene glycol mono-ricinoleate forming a total of at least approximately 20 percent by weight of the brake fluid.

4. A heavy-duty hydraulic brake fluid consisting essentially of, per 100 parts by volume, 50 to 75 parts by volume of a diluent chosen from the group consisting of methoxy-butanol and the lower mono-alkyl ethers of diethylene glycol, said ethers being of a pure low gravity grade having an ethylene glycol content of not more than approximately 3 percent ethylene glycol by volume, from 5 to 20 parts by volume of propylene glycol mono-ricinoleate, from 5 to 20 parts by volume of a substantially water-insoluble polypropylene glycol having an average molecular weight between 1,000 and 3,000, from 5 to 25 parts by volume of propylene glycol, together with small but effective amounts of anti-oxidant and corrosion inhibitor, said polypropylene glycol plus said propylene glycol mono-ricinoleate forming a total of at least 20 percent by weight of the brake fluid.

5. A heavy-duty hydraulic brake fluid consisting essentially of, per 100 parts by volume, 50 to 75 parts by volume of a diluent chosen from the group consisting of methoxy-butanol and the lower mono-alkyl ethers of diethylene glycol, said ethers being of a pure low gravity grade having an ethylene glycol content of not more than approximately 3 percent ethylene glycol by volume, from 5 to 20 parts by volume of propylene glycol mono-ricinoleate, from 5 to 20 parts by volume of a substantially water-insoluble polypropylene glycol having an average molecular weight of approximately 2,000, from 5 to 25 parts by volume of at least one glycol chosen from the group consisting of propylene glycol, butylene glycol and hexylene glycol, together with small but effective amounts of anti-oxidant and corrosion inhibitor, said polypropyleneglycol plus said propylene glycol mono-ricinoleate forming a total of at least 20 percent by weight of the brake fluid.

6. A heavy-duty hydraulic brake fluid consisting essentially of, per 100 parts by volume, 50 to 75 parts by volume of methoxy-butanol, from 5 to 20 parts by volume of propylene glycol mono-ricinoleate, from 5 to 20 parts by volume of a substantially water-insoluble polypropylene glycol having an average molecular weight between 1,000 and 3,000, from 5 to 25 parts by volume of at least one glycol chosen from the group consisting of propylene glycol, butylene glycol and hexylene glycol, together with small but effective amounts of anti-oxidant and corrosion inhibitor, said polypropylene glycol plus said propylene glycol mono-ricinoleate forming a total of at least 20 percent by weight of the brake fluid.

7. A heavy-duty hydraulic brake fluid consisting essentially of, per 100 parts by volume, 50 to 75 parts by volume of diethylene glycol mono-ethyl ether, said ether being of a pure low gravity grade having an ethylene glycol content of not more than approximately 3 percent ethylene glycol by volume, from 5 to 20 parts by volume of propylene glycol mono-ricinoleate, from 5 to 20 parts by volume of a substantially water-insoluble polypropylene glycol having an average molecular weight between 1,000 and 3,000, said polypropylene glycol plus said ricinoleate of a glycol forming a total of at least approximately 20 percent by weight of the brake fluid, and from 5 to 25 parts by volume of at least one glycol chosen from the group consisting of propylene glycol, butylene glycol and hexylene glycol, together with small but effective amounts of anti-oxidant and corrosion inhibitor.

8. A heavy-duty hydraulic brake fluid consisting essentially of, per 100 parts by volume, 50 to 75 parts by volume of a lower mono-alkyl ether of diethylene glycol, said ether being of a pure low gravity grade having an ethylene glycol content of not more than approximately 3 percent ethylene glycol by volume, from 5 to 20 parts by volume of propylene glycol mono-ricinoleate, from 5 to 20 parts by volume of a substantially water-insoluble polypropylene glycol having an average molecuar weight between 1,000 and 3,000, said polypropylene glycol plus said ricinoleate of a glycol forming a total of at least approximately 20 percent by weight of the brake fluid, and from 5 to 25 parts by volume of at least one glycol chosen from the group consisting of propylene glycol, butylene glycol and hexylene glycol, together with a small but effective amount of corrosion inhibitor.

9. A heavy-duty hydraulic brake fluid consisting essentially of, per 100 parts by volume, about 65 parts diethylene glycol mono-ethyl ether, said ether being of a pure low gravity grade having an ethylene glycol content of not more than approximately 3 percent ethylene glycol by volume, about 11.5 parts of a substantially water-insoluble polypropylene glycol having an average molecular weight of approximately 2,000, about 5 parts 2-methyl-2, 4-pentanediol, about 5 parts propylene glycol, about 12.5 parts propylene glycol mono-ricinoleate, and a small but effective amount of corrosion inhibitor, said polypropylene glycol plus said ricinoleate of a glycol forming a total of at least approximately 20 percent by weight of the brake fluid.

10. A heavy-duty hydraulic brake fluid consisting essentially of, per 100 parts by volume, about 70 parts diethylene glycol mono-ethyl ether, said ether being of a pure low gravity grade having an ethylene glycol content of not more than approximately 3 percent ethylene glycol by volume, about 11.5 parts of a substantially water-insoluble polypropylene glycol having an average molecular weight of approximately 2,000, about 5 parts propylene glycol, about 12.5 parts propylene glycol mono-ricinoleate, and a small but effective amount of a corrosion inhibitor, said polypropylene glycol plus said ricinoleate of a glycol forming a total of at least approximately 20 percent by weight of the brake fluid.

11. A heavy-duty hydraulic brake fluid consisting essentially of, per 100 parts by volume, 50 to 75 parts by volume of diethylene glycol mono-ethyl ether, said ether being of a pure low gravity grade having an ethylene glycol content of not more than approximately 3 percent ethylene glycol by volume, from 5 to 20 parts by volume of a ricinoleate of a glycol, said glycol being an aliphatic glycol having not over five carbon atoms per molecule, from 5 to 20 parts by volume of a substantially water-insoluble polypropylene glycol having an average molecular weight between 1,000 and 3,000, from 5 to 25 parts by volume of at least one glycol chosen from the group consisting of propylene glycol, butylene glycol and hexylene glycol, together with small but effective amounts of anti-oxidant and corrosion inhibitor, said polypropylene glycol plus said ricinoleate of a glycol forming a total of at least approximately 20 percent by weight of the brake fluid.

12. A heavy-duty hydraulic brake fluid consisting essentially of, per 100 parts by volume, 50 to 75 parts by volume of a lower mono-alkyl ether of diethylene glycol, said ether being of a pure low gravity grade having an ethylene glycol content of not more than approximately 3 percent ethylene glycol by volume, from 5 to 20 parts by volume of a ricinoleate of a glycol, said glycol being an aliphatic glycol having not over five carbon atoms per molecule, from 5 to 20 parts by volume of a substantially water-insoluble polypropylene glycol having an average molecular weight between 1,000 and 3,000, from 5 to 25 parts by volume of at least one glycol chosen from the group consisting of propylene glycol, butylene glycol and hexylene glycol, together with small but effective amounts of anti-oxidant and corrosion inhibitor, said polypropylene glycol plus said ricinoleate of a glycol forming a total of at least approximately 20 percent by weight of the brake fluid.

13. A heavy-duty hydraulic brake fluid consisting essentially of, per 100 parts by volume, about 65 parts diethylene glycol mono-ethyl ether, said ether being of a pure low gravity grade having an ethylene glycol content of not more than approximately 3 percent ethylene glycol by volume, about 11.5 parts of a substantially water-insoluble polypropylene glycol having an average molecular weight of approximately 2,000, about 5 parts 2-methyl-2, 4-pentanediol, about 5 parts propylene glycol, about 12.5 parts propylene glycol mono-ricinoleate, and small but effective amounts of anti-oxidant and corrosion inhibitor, said polypropylene glycol plus said ricinoleate of a glycol forming a total of at least approximately 20 percent by weight of the brake fluid.

14. A heavy-duty hydraulic brake fluid consisting essentially of, per 100 parts by volume, about 70 parts diethylene glycol mono-ethyl ether, said ether being of a pure low-gravity grade having an ethylene glycol content of not more than approximately 3 percent ethylene glycol by volume, about 11.5 parts of a substantially water-insoluble polypropylene glycol having an average molecular weight of approximately 2,000, about 5 parts propylene glycol, about 12.5 parts propylene glycol mono-ricinoleate, and small but effective amounts of anti-oxidant and corrosion inhibitor, said polypropylene glycol plus said ricinoleate of a glycol forming a total of at least approximately 20 percent by weight of the brake fluid.

References Cited in the file of this patent

UNITED STATES PATENTS

| | | |
|---|---|---|
| 2,232,581 | Woodhouse | Feb. 18, 1941 |
| 2,507,401 | Doelling | May 9, 1950 |
| 2,665,312 | Ohlman et al. | Jan. 5, 1954 |

UNITED STATES PATENT OFFICE

CERTIFICATE OF CORRECTION

Patent No. 2,921,906                               January 19, 1960

George L. Doelling et al.

It is hereby certified that error appears in the printed specification of the above numbered patent requiring correction and that the said Letters Patent should read as corrected below.

Column 3, line 37, Example No. 1, for "cc-- 6.5" read -- cc-- 65 --; line 39, same Example No. 1, for "-pentaneidiol" read -- -pentanediol --.

Signed and sealed this 28th day of June 1960.

(SEAL)
Attest:

KARL H. AXLINE
Attesting Officer

ROBERT C. WATSON
Commissioner of Patents